(12) United States Patent
Ohno et al.

(10) Patent No.: US 8,099,563 B2
(45) Date of Patent: Jan. 17, 2012

(54) STORAGE DEVICE AND ACCESS INSTRUCTION SENDING METHOD

(75) Inventors: Masatomo Ohno, Chigasaki (JP); Hideaki Fukuda, Odawara (JP); Yasuhiro Igarashi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 927 days.

(21) Appl. No.: 12/081,902

(22) Filed: Apr. 23, 2008

(65) Prior Publication Data

US 2009/0216965 A1 Aug. 27, 2009

(30) Foreign Application Priority Data

Feb. 22, 2008 (JP) .................................. 2008-041480

(51) Int. Cl.
*G06F 12/00* (2006.01)
(52) U.S. Cl. ....................................................... 711/151
(58) Field of Classification Search .................. None
See application file for complete search history.

(56) References Cited

U.S. PATENT DOCUMENTS 6,810,440 B2 * 10/2004 Micalizzi et al. ............... 710/19

FOREIGN PATENT DOCUMENTS

| EP | 1261173 A2 | 11/2002 |
| EP | 1708076 A1 | 10/2006 |
| JP | 10-011387 | 6/1996 |

* cited by examiner

*Primary Examiner* — Brian Peugh
(74) *Attorney, Agent, or Firm* — Volpe and Koenig, P.C.

(57) ABSTRACT

A storage device for storing data sent from a host apparatus comprises a plurality of processors sending to a cache memory controller an access instruction relating to transmission of the data, based on an access request relating to the transmission of the data, the access request being sent from the host apparatus; and an access instruction sending unit exclusively sending to the cache memory the access instruction sent from the plurality of processors, wherein the access instruction sending unit includes a plurality of storage units for storing an access instruction which requires a response, and wherein when the access instruction which requires a response is stored in all of the storage units, the access instruction sending unit sends only an access instruction which requires a response to the cache memory controller.

10 Claims, 11 Drawing Sheets

STORAGE DEVICE AND ACCESS INSTRUCTION SENDING METHOD

CROSS-REFERENCES TO RELATED APPLICATIONS

This application relates to and claims priority from Japanese Patent Application No. 200841480, filed on Feb. 22, 2008, the entire disclosure of which is incorporated herein by reference.

BACKGROUND

The invention relates generally to storage device and an access instruction sending method, and is suitable for application in, for example, a storage device having an arbiter allowing exclusive access by arbitrating between accesses from plural processors.

Currently, when a plurality of bus masters connected to a bus operate by sharing the bus, a bus master requests a usage right; acquires a bus right; and then uses the right. The bus usage right is managed by a bus arbiter (an arbiter), and with respect to requests for bus usage rights from the bus masters, the bus arbiter provides the bus usage right in the appropriate order of priority.

As an example of a technique of this sort, there is a system having a bus supporting a split transaction in order to improve bus efficiency, in which a bus is used effectively by optimizing the number of DMA command buffer layers in accordance with the number of received buffer layers on a bus slave side (for example, see JP10-011387 A).

SUMMARY

In the meantime, when a plurality of processors try to write-access common resource memory, an arbiter arbitrates between the write accesses and excludes accesses other than write access, and after performing the exclusion process, transfers a write access instruction to a memory control circuit in the common resource memory.

When the write access has the same specification as that of the write access waiting for a response (a response-required write access), an arbiter must keep the transferred write instructions waiting for a response (a response-required write instruction) in a buffer, until a response is received from the memory control circuit.

As a result, an arbiter cannot accept more than a certain number of response-required write instructions, and even if it can accept a write instruction which does not need to wait for a response (a response-free write access instruction) during that period, the arbiter cannot transfer the aforementioned response-free write access instruction because the arbiter arbitrated between the write access instructions and excluded instructions other than write access instructions, so there is a problem in that the arbiter cannot perform data transfer efficiently.

The current invention has been devised in consideration of the above-described points, and it is an object of the present invention to provide a storage device and an access instruction sending method capable of improving throughput by efficiently performing data transfer.

In order to solve the aforementioned problem, according to an aspect of the invention, a storage device for storing data sent from a host apparatus includes a plurality of processors sending to a cache memory controller an access instruction relating to transmission of the data, based on an access request relating to the transmission of the data, the access request being sent from the host apparatus; and an access instruction sending unit exclusively sending to the cache memory the access instruction sent from the plurality of processors, wherein the access instruction sending unit includes a plurality of storage units for storing an access instruction which requires a response, and wherein when the access instruction which requires a response is stored in all of the storage units, the access instruction sending unit sends only an access instruction which requires a response to the cache memory controller.

According to another aspect of the invention, an access instruction sending method for a storage device storing data sent from a host apparatus, includes a first step in which a plurality of processors sends to a cache memory controller an access instruction relating to transmission of the data, based on an access request relating to the transmission of the data, and the access request is sent from the host apparatus; and a second step in which an access instruction sending unit exclusively sends to the cache memory the access instruction sent from the plurality of processors, wherein in the second step, when an access instruction which requires a response is stored in all storage units that store the access instruction which requires a response, only an access instruction which do not need a response is sent to the cache memory controller.

Accordingly, when access instructions which need responses are stored in all storage units, the present invention can effectively prevent the transfer of access instructions that do not need responses from ceasing, and can transfer only data corresponding to the aforementioned access instructions that do not need responses.

According to the present invention, a storage device and an access instruction sending method capable of improving throughput by efficiently performing data transfer can be achieved.

Other aspects and advantages of the invention will be apparent from the following description and the appended claims.

DETAILED DESCRIPTION OF PREFERRED EMBODIMENTS

An embodiment of the present invention will be described below with reference to the attached drawings. It should be understood that the present invention is not limited to this embodiment.

Figure 1:
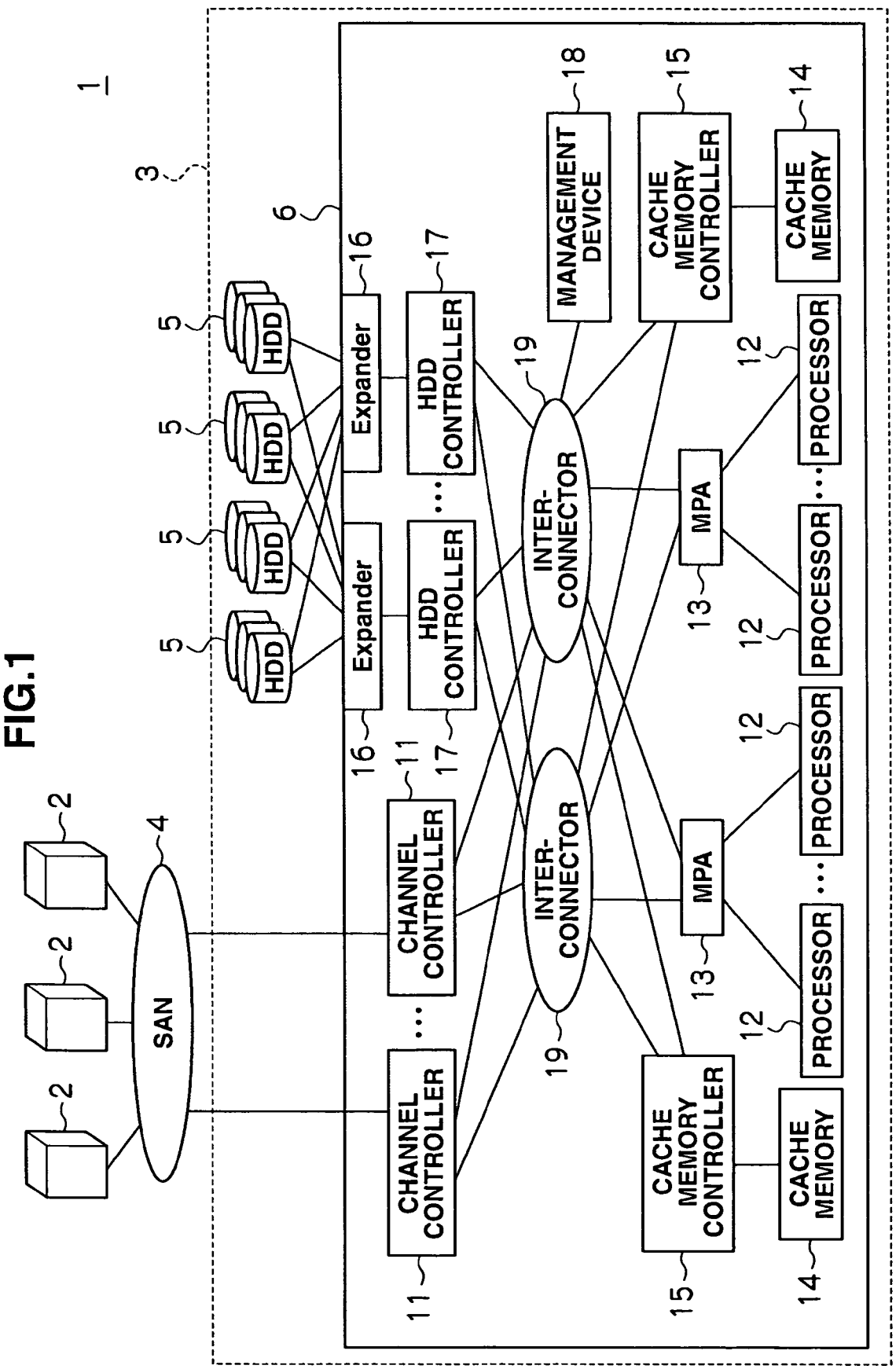
FIG. 1 is a block diagram showing the schematic configuration of a storage system according to the embodiment.

FIG. 1 shows the configuration of a storage system 1 according to the embodiment. The storage system 1 is configured by connecting a host apparatus 2 and a storage device 3 via a SAN (Storage Area Network) 4.

The host apparatus 2 is a computer apparatus provided with a CPU (Central Processing Unit), and an information-processing resource (not shown), such as memory; and can be, for example, a personal computer, a work station, or a mainframe. Also, the host apparatus 2 is configured by including a host bus adaptor (FC HBA) (not shown) for connecting to the SAN 4. Furthermore, the host apparatus 2 is configured by including a keyboard, a switch, a pointing device, an information input device (not shown), such as a microphone, a monitor display, and an information output device (not shown), such as a speaker.

The SAN 4 transfers commands or data between the host apparatus 2 and the storage device 3 in units of blocks, which is a management unit for data in a storage resource provided by the host apparatus 2. In this case, the communications protocol used between the host apparatus 2 and the storage device 3 is a fibre channel protocol.

Incidentally, the host apparatus 2 and the storage device 3 do not have to be connected via the SAN 4, but they may be connected via a LAN, or the like. For example, when connecting them via the LAN, commands and data are transferred in accordance with, for example, TCP/IP (Transmission Control Protocol/Internet Protocol). Also, when connecting them via the LAN, a LAN-compliant network card or similar may be used in place of host bus adaptor.

The storage device 3 is configured by having a plurality of hard disk drives (HDDs: Hard Disk Drives) 5 for storing data and a storage controller 6 controlling data input and output to/from the aforementioned hard disk drive 5.

The storage controller 6 is configured by interconnecting via an inter-connector 19 a plurality of channel controllers 11, a plurality of MPAs (Microprocessor Adapters) 13, to which plural processors 12 are respectively connected, a plurality of cache memory controllers 15, to which cache memory 14 are respectively connected, a plurality of HDD controllers 17, to which expanders 16 are respectively connected, and management devices 18. Also, the storage controller 6 is connected to the hard disk drive 5 via the expander 16.

The channel controller 11, for example, reports to the processor 12 a request (for example, a read access request or a write access request) received from the host apparatus 2, and in accordance with an instruction (for example, read access instruction (read) or a write access instruction (write)) from the processor 12, transfers data between the host apparatus 2 and the cache memory 14 via the cache memory controller 15 and the HDD controller 17.

The processor 12 controls the entire storage controller 6, and for example, interprets a request reported from the channel controller 11, then reports the instruction to the channel controller 11, the cache memory controller 15, and the HDD controller 17. Also, processor 12 performs RAID (Redundant Arrays of Independent Disks) control with respect to the hard disk drive 5, and thereby the reliability, availability, and performance of the storage device 3 can be improved.

The processor 12 operates the hard disk drive 5 using a RAID method. The processor 12 sets one or more logical volumes in a physical storage area (a RAID group) provided by one or more of the hard disk drives 5. Data is stored in this logical volume(s) in units of blocks of a certain size (hereinafter referred to as "logical blocks").

A unique identifier (hereinafter referred to as a "LU (Logical Unit number)") is assigned to each logical volume. In the present embodiment, the combination of this LU and another unique number (hereinafter referred to as a "LBA (Logical Block Address)") assigned to each logical block is used as an address, and data input and output are performed by specifying the aforementioned address.

Also, the processor 12 includes memory for storing, for example, management information on the cache memory 14, or configuration information on the storage device 3. Various control programs or management tables are stored in the memory in the processor 12.

The MPA 13 exclusively transfers a read access instruction or a write access instruction transferred from the processors 12 to the cache memory controller 15 in the cache memory 14.

The cache memory controller 15 controls the cache memory 14, and stores data transferred from the channel controller 11 or the HDD controller 17 in the cache memory 14. The cache memory 14 is memory for temporarily storing data which should be stored in the hard disk drive 5 or data which should be transferred to the host apparatus 2.

The HDD controller 17 controls the hard disk drive 5, and in accordance with an instruction from the processor 12, performs data transfer between the hard disk drive 5 and the cache memory 14 via the expander 16. Also, the HDD controller 17 performs RAID (Redundant Arrays of Independent Disks) control with respect to the hard disk drive 5, and thereby the reliability, availability, and performance of the storage device 3 can be improved.

The management device 18 is a management terminal for managing the operations of the entire storage device 3, and consists of, for example, a laptop personal computer. The management device 18 directs various processing in accordance with operator's instructions. For example, an operator operates the management device 18, has various statuses of the storage device 3 displayed on the screen of the management device 18, and thereby the operator can check the status of the storage device 3.

Figure 2:
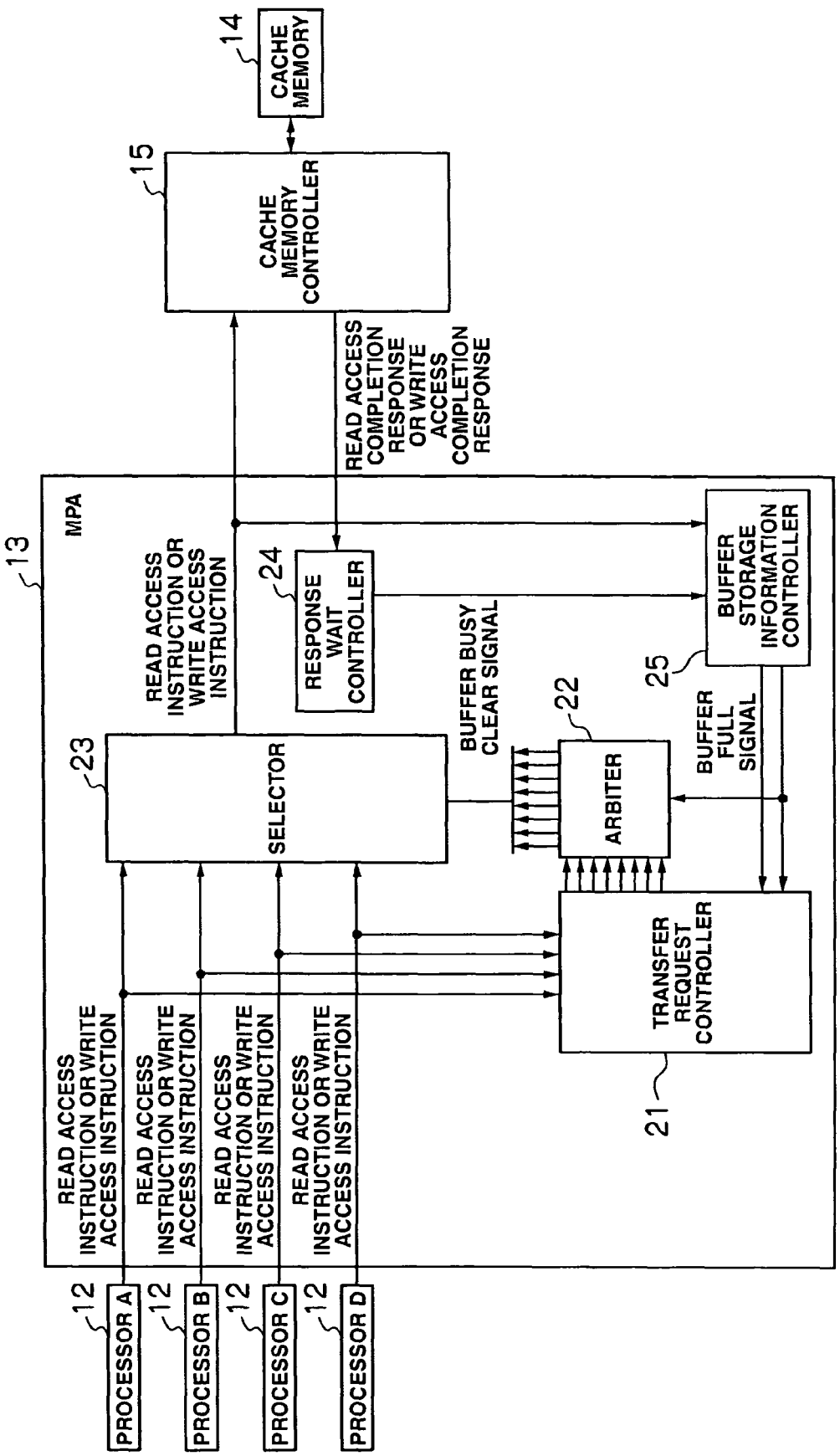
FIG. 2 is a block diagram showing the schematic configuration of an MPA.

FIG. 2 shows the configuration of the MPA 13. The MPA 13 is configured by including a transfer request controller 21, an arbiter 22, a selector 23, a response wait controller 24, and a buffer storage information controller 25. Incidentally, the MPA 13 is connected to the processor A (12)-the processor D (12).

The transfer request controller 21 analyzes a read access instruction or write access instruction transferred from the processors A-D, judges whether or not the read access instruction or write access instruction is one that waits for a response, and then transfers a response-required access request or a response-free access request to the arbiter 22. During the period in which a 'buffer full' signal (will be described later below) is sent from the buffer storage information controller 25, the transfer request controller 21 stops transferring the response-required access request and transfers only the response-free access request to the arbiter 22.

Based on the response-required access request or response-free access request transferred from the transfer request controller 21, the arbiter 22 instructs the selector 23 regarding which of the response-required access request or response-free access request should be exclusively transferred to the cache memory controller 15 in the order of priority determined by round robin. During the period in which a 'buffer full' signal (will be described later below) is sent from the buffer storage information controller 25, the arbiter 22 indicates to the selector 23 which of the read access instruction or write access instruction should be exclusively transferred to the cache memory controller 15 in the order of priority determined by round robin, based only on the response-free access request.

Based on the transfer command from the arbiter 22, the selector 23 transfers the read access instruction or write access instruction transferred from the processors A-D to the cache memory controller 15.

The response wait controller 24 analyzes a read access completion response or a write access completion response transferred from the cache memory controller 15, and sends to the buffer storage information controller 25 a 'buffer BUSY clear' signal for changing a flag 62B (described later below), which returns a completion response, from "1" to "0," in a storage unit 62 in the buffer storage information controller 25. Incidentally, when a read access instruction or write access instruction is stored in a buffer 62A (described later below) in the storage unit 62 in the buffer storage information controller 25, the flag 62B will be "1," and when a read access instruction or write access instruction is not stored, the flag 62B will be "0."

The buffer storage information controller 25 stores the read access instruction or write access instruction transferred from the processors A-D to the buffer 62A in the storage unit 62 in the buffer storage information controller 25, and then changes the flag 62B from "0" to "1." And during the period in which the read access instructions or write access instructions are stored in all buffers 62A and all flags 62B are changed to "1," the buffer storage information controller 25 sends to the transfer request controller 21 and the arbiter 22 a 'buffer full' signal for reporting that a read access instruction or write access instruction cannot be stored in the buffer 62A during that period).

Figure 3:
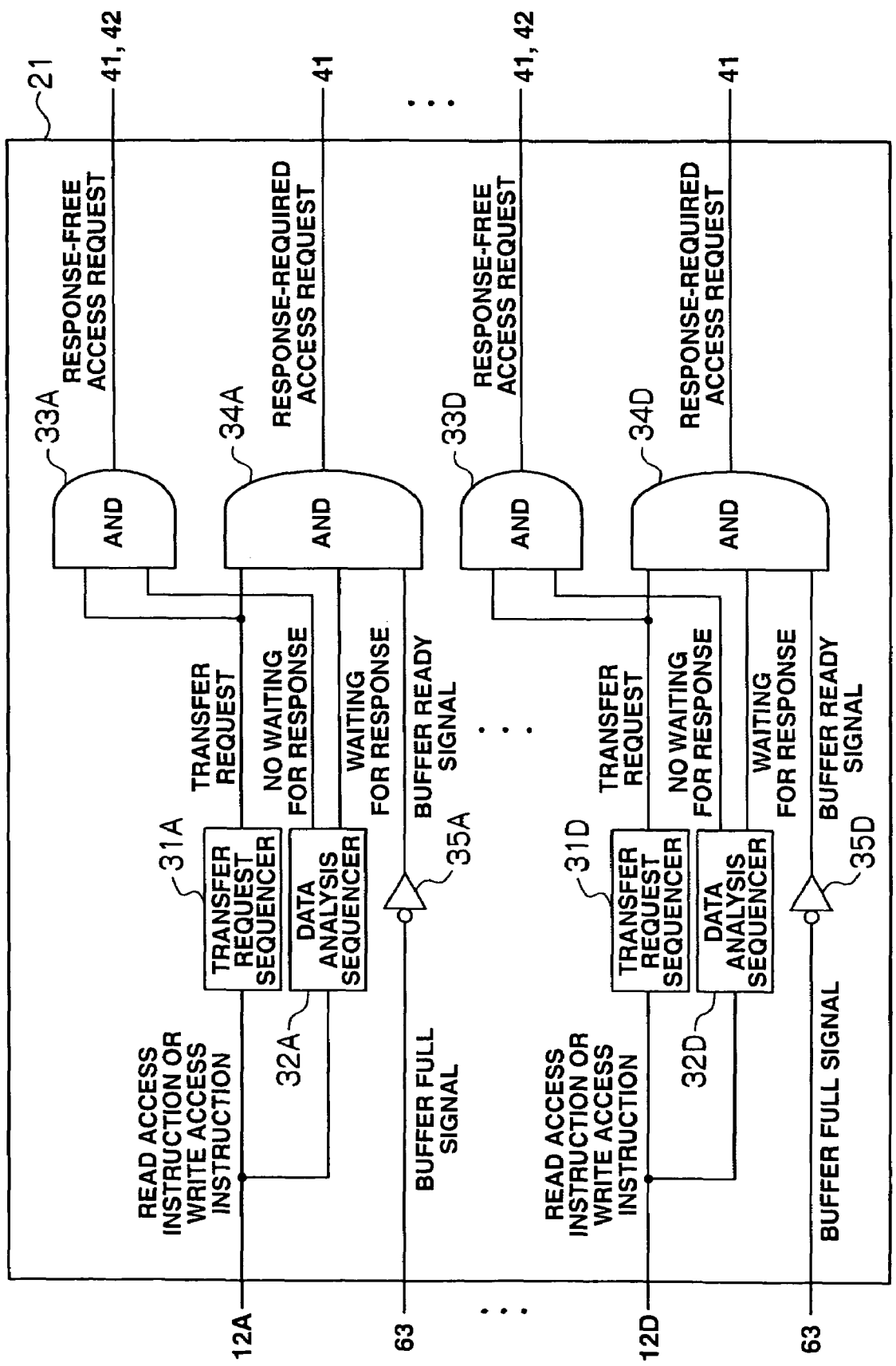
FIG. 3 is a block diagram showing the schematic configuration of a transfer request controller.

FIG. 3 shows the configuration of the transfer request controller 21. The transfer request controller 21 is configured by including transfer control sequencers 31A-31D, data analysis sequencers 32A-32D, AND circuits 33A-33D, AND circuits 34A-34D, and inverters 35A-35D.

When receiving a read access instruction or write access instruction from the processor A, the transfer control sequencer 31A sends to the AND circuit 33A and the AND circuit 34A a transfer request for requesting the transfer of the read access instruction or write access instruction.

When receiving a read access instruction or write access instruction from the processor A, the data analysis sequencer 32A analyzes a command in the read access instruction or write access instruction, and checks whether the command is a response-required read access instruction or response-required write access instruction, or a response-free read access instruction or response-free write access instruction.

If the command is a response-required read access instruction or response-required write access instruction, the data analysis sequencer 32A sends to the AND circuit 34A a signal for reporting that the command is a response-required access instruction; and if the command is a response-free read access instruction or response-free write access instruction, the data analysis sequencer 32A sends to the AND circuit 33A a signal for reporting that the command is a response-free access instruction.

When receiving a transfer request from the transfer control sequencer 31A and receiving the signal reporting that the command is a response-free access instruction, the AND circuit 33A transfers a response-free access request to a response-required/response-free round-robin sequencer 41 and a response-free round-robin sequencer 42.

When receiving a transfer request from the transfer control sequencer 31A, receiving a signal from the data analysis sequencer 32A reporting that the command is a response-required access instruction, or receiving a buffer ready signal (will be described later below) from a shut-down circuit 35A, the AND circuit 34A transfers a response-required access request to the response-required/response-free round-robin sequencer 41 in the arbiter 22.

The inverter 35A sends to the AND circuit 34A a buffer ready signal for reporting that a read access instruction or write access instruction can still be stored in the buffer 62A, and during the period in which a 'buffer full' signal is received from the AND circuit 63 (will be described later below) in the buffer storage information controller 25, the inverter 35A stops sending the buffer ready signal. Thus, the transfer request controller 21 can stop the transfer of a response-required access request when a read access instruction or write access instruction cannot be stored in the buffer 62A.

When receiving a read access instruction or write access instruction from the processor B-D(12), the transfer control sequencer 31B-31D, the data analysis sequencer 32B-32D, the AND circuit 33B-33D, the AND circuit 34B-34D, and the inverter 35B-35D execute the same processing as that executed by the above-described transfer control sequencer 31A, the data analysis sequencer 32A, the AND circuit 33A, the AND circuit 34A, and the inverter 35A.

Figure 4:
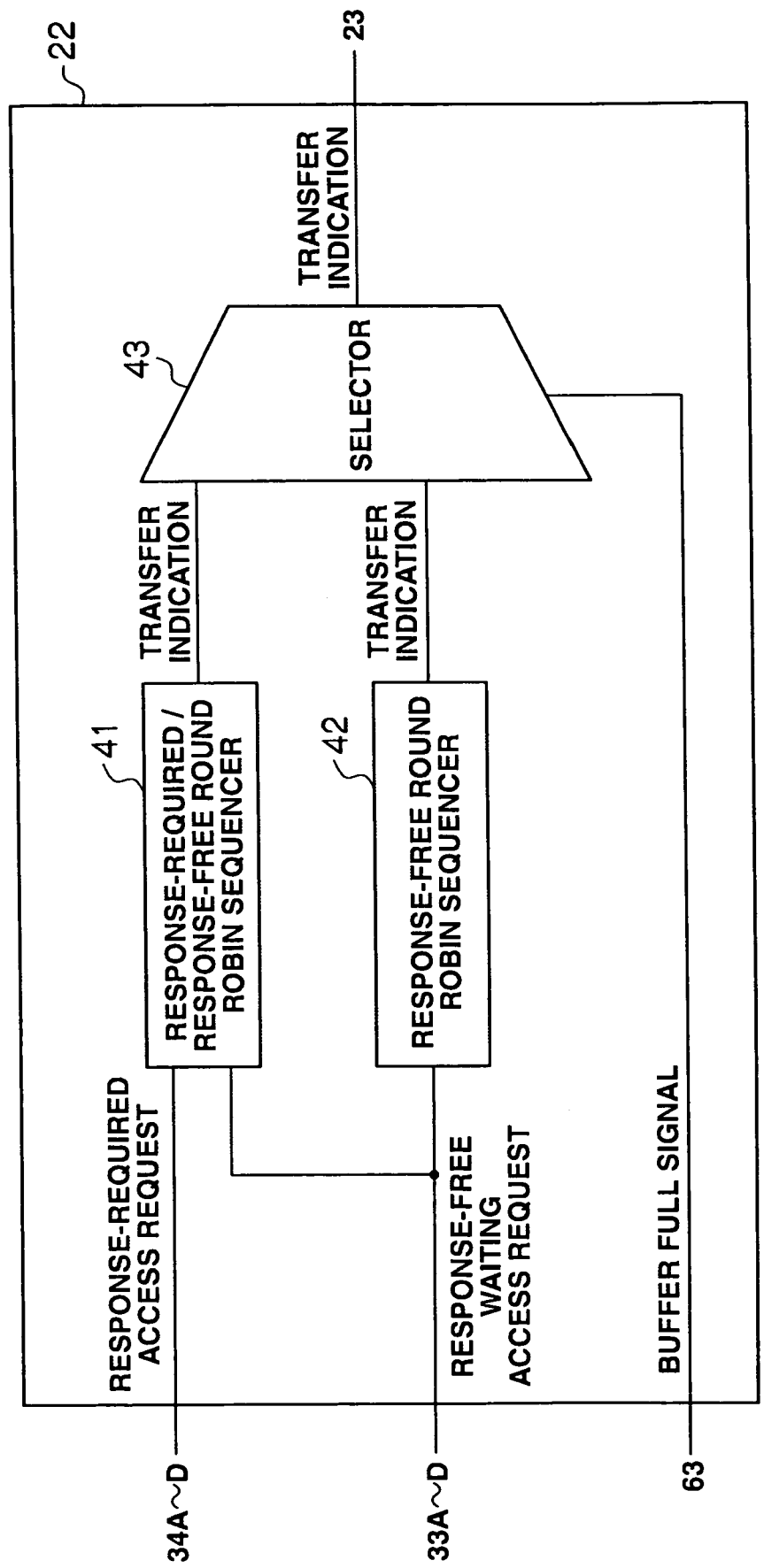
FIG. 4 is a block diagram showing the schematic configuration of an arbiter.

FIG. 4 shows the configuration of the arbiter 22. The arbiter 22 is configured by including the response-required/response-free round-robin sequencer 41, the response-free round-robin sequencer 42 and a selector 43.

Based on a response-free access request transferred from the AND circuit 33A-33D in the transfer request controller 21 and a response-required access request transferred from the AND circuit 34A-34D, the response-required/response-free round-robin sequencer 41 determines which of the read access instruction or write access instruction should be exclusively transferred to the cache memory controller 15 in the order of priority determined by round robin, and transfers the transfer command to the selector 43.

Based on a response-free access request transferred from the AND circuit 33A-33D in the transfer request controller 21, the response-free round-robin sequencer 42 determines which of the read access instruction or write access instruction should be exclusively transferred to the cache memory controller 15 in the order of priority determined by round robin, and transfers the transfer command to the selector 43.

During the period in which the selector 43 receives a 'buffer full' signal from the AND circuit 63 (described later below) in the buffer storage information controller 25, the selector 43 transfers the transfer command transferred from the response-free round-robin sequencer 42 to the selector 23. When the receipt of the 'buffer full' signal from the AND circuit 63 stops, the selector 43 transfers the transfer command transferred from the response-required/response-free round-robin sequencer 41 to the selector 23. Thus, the arbiter 22 can resume the transfer of a response-required access request and can stop transferring the transfer command from the response-required/response-free round-robin sequencer 41 when a read access instruction or write access instruction cannot be stored in the buffer 62A.

Figure 5:
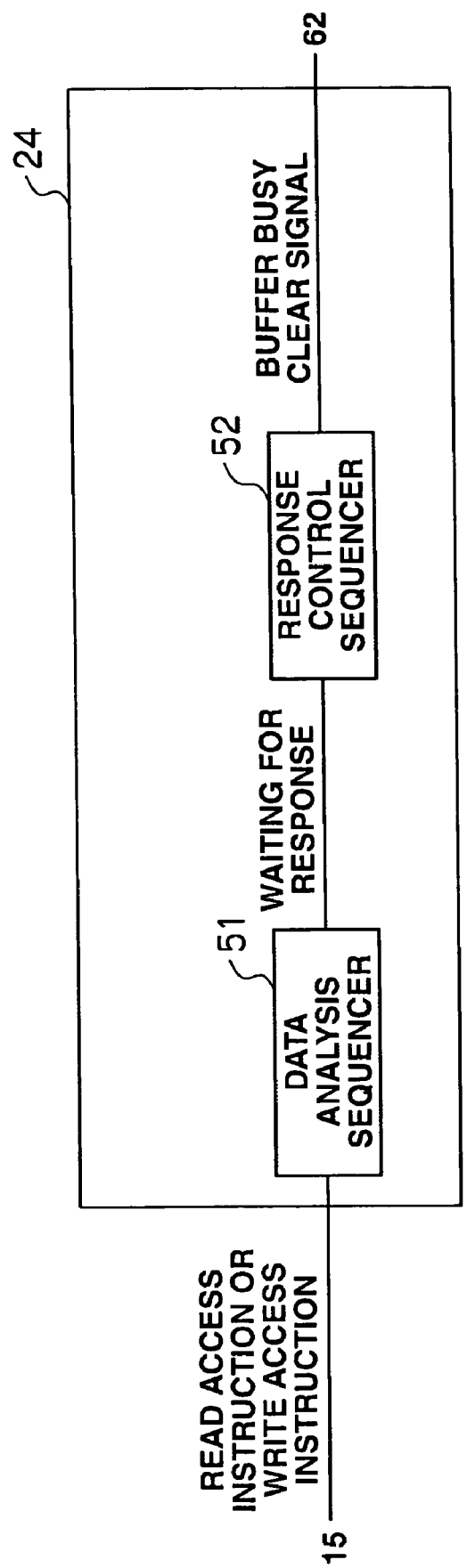
FIG. 5 is a block diagram showing the schematic configuration of a response wait controller.

FIG. 5 shows the configuration of the response wait controller 24. The response wait controller 24 is configured by including the data analysis sequencer 51 and a response control sequencer 52.

When receiving a read access completion response or write access completion response from the cache memory controller 15, the data analysis sequencer 51 analyzes a command in the read access completion response or write access completion response, and checks whether the command is a response-required read access completion response or response-required write access completion response, or a response-free read access completion response or response-free write access completion response.

If the command is a response-required read access completion response or response-required write access completion response, the data analysis sequencer 51 sends to the response control sequencer 52 a signal for reporting that the command is a response-required completion response.

When receiving the signal sent from the data analysis sequencer 51 reporting that the command is a response-required completion response, the response control sequencer 52 sends a 'buffer BUSY clear' signal to the storage unit 62 where a read access instruction or write access instruction, which corresponds to the read access completion response or write access completion response for the signal reporting that the command is a response-required completion response, is stored.

Figure 6:
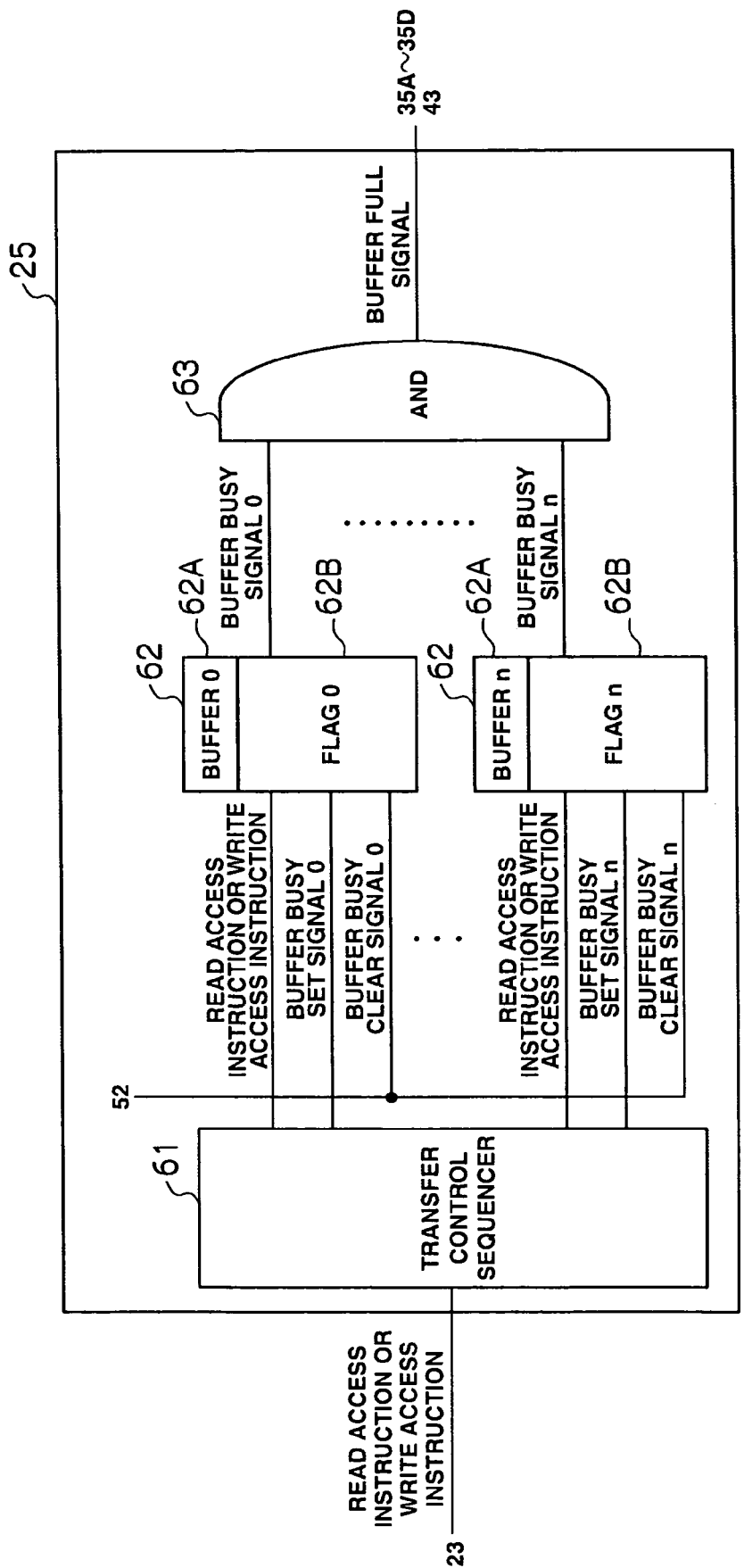
FIG. 6 is a block diagram showing the schematic configuration of a buffer storage information controller.

FIG. 6 shows the configuration of the buffer storage information controller 25. The buffer storage information controller 25 is configured by including the transfer control sequencer 61, the storage unit 62, and the AND circuit 63. Also, the buffer storage information controller 25 has the "n+1" number of the storage units 62 numbered "0" to "n" respectively.

When receiving a read access instruction or write access instruction transferred from the processors A-D via the selector 23, the transfer control sequencer 61 transfers the read access instruction or write access instruction to the buffer 62A in the available storage unit 62, and sends to a flag 62B a 'buffer BUSY set' signal for changing the flag 62B, which is in the storage unit 62 where a read access instruction or write access instruction is stored, from "0" to "1."

The storage unit 62 is configured by including the buffer 62A for storing a read access instruction or write access instruction and the flag 62B for judging whether or not a read access instruction or write access instruction is stored in the buffer 62A. When receiving a read access instruction or write access instruction from the transfer control sequencer 61, the storage unit 62 stores the read access instruction or write access instruction in the designated buffer 62A, and when receiving a 'buffer BUSY set' signal from the transfer control sequencer 61, changes the flag 62B, which is in the storage unit 62 where the read access instruction or write access instruction is stored, from "0" to "1."

Also, during the period in which the flag 62B, which is in the storage unit 62 where the read access instruction or write access instruction is stored, is changed from "0" to "1," the storage unit 62 sends to the AND circuit 63 a 'buffer BUSY' signal for reporting that the read access instruction or write access instruction is stored in the buffer 62A.

Meanwhile, when a 'buffer BUSY clear' signal is sent from the response control sequencer 52 in the response wait controller 24, the storage unit 62 changes the flag 62B, which is in the storage unit 62 where the read access instruction or write access instruction is stored, from "1" to "0," and deletes the read access instruction or the write access instruction stored in the buffer 62A.

Also, when the flag 62B, which is in the storage unit 62 where the read access instruction or write access instruction is stored, is changed from "1" to "0," the storage unit 62 stops sending a 'buffer BUSY' signal to the AND circuit 63.

When receiving 'buffer BUSY' signals from all of the storage units 62 numbered "0" to "n," the AND circuit 63 sends a 'buffer full' signal to the transfer request controller 21 and the arbiter 22 during the period in which the AND circuit 63 receives all of the 'buffer BUSY' signals. Also, when 'buffer BUSY' signals are not received from all of the storage units 62, the AND circuit 63 stops sending a 'buffer full' signal.

Accordingly, when it becomes possible to store a read access instruction or write access instruction in the buffer 62A, the buffer storage information controller 25 can resume sending the transfer command transferred from the response-required/response-free round-robin sequencer 41.

Next, access instruction transfer processing executed by the storage controller 6 in the storage system 1 according to the present embodiment will be described.

Figure 7:
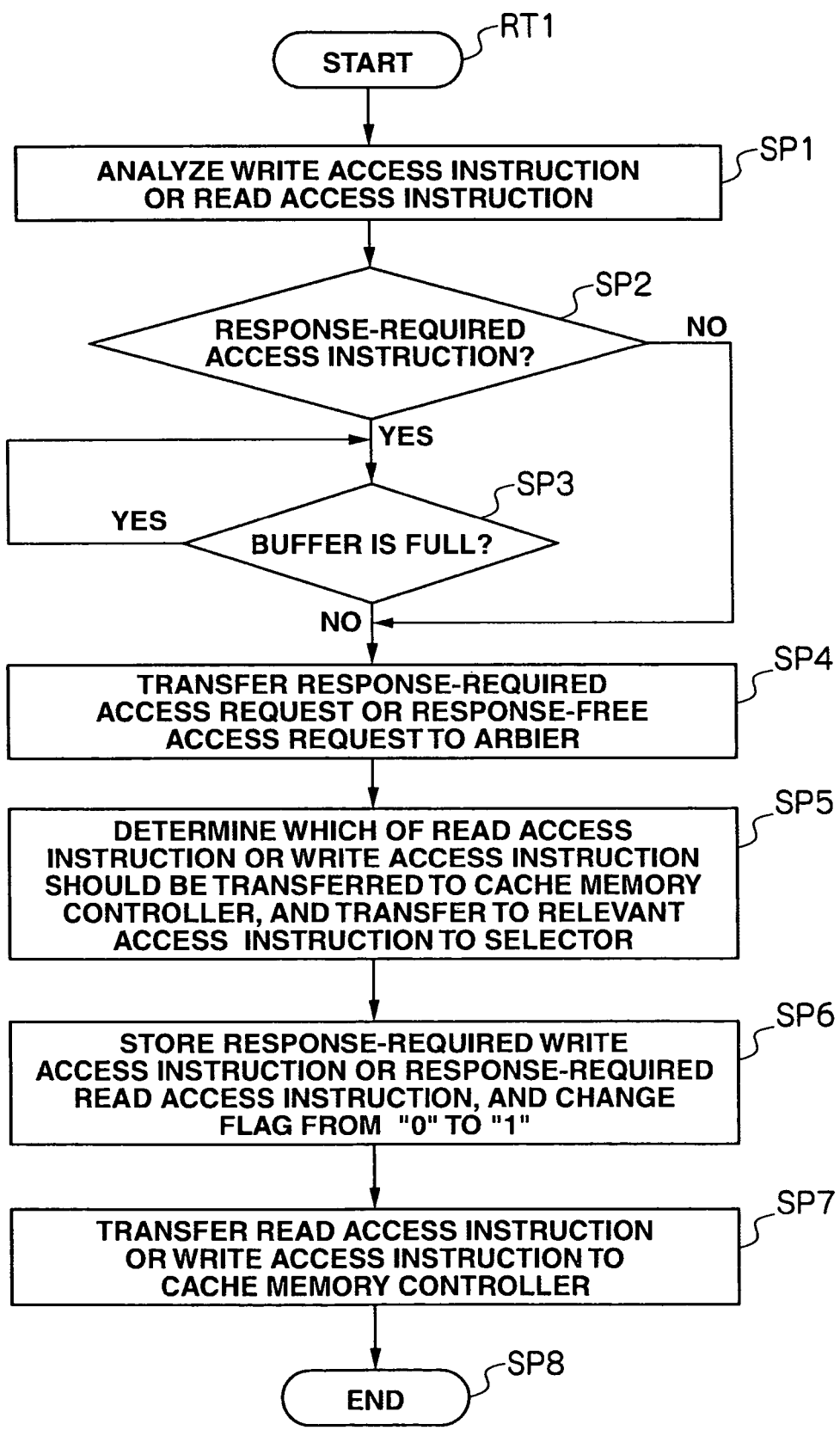
FIG. 7 is a flowchart illustrating access command transfer processing steps.

FIG. 7 is an example of the flowchart illustrating specific processing steps of the MPA 13 in the storage controller 6, and the steps relate to the access instruction transfer processing.

When receiving a read access instruction or write access instruction from the processor A-D (12), the MPA 13 analyzes a command in the read access instruction or write access instruction using the data analysis sequencer 32A-32D, in accordance with access instruction transfer processing steps RT1 illustrated in FIG. 7 (SP1).

The MPA 13 then checks whether or not the command, which is analyzed by the data analysis sequencer 32A-32D, in the read access instruction or write access instruction is a response-required read access instruction or response-required write access instruction (SP2).

If the analyzed command in the read access instruction or write access instruction is not a response-required read access instruction or response-required write access instruction (SP2: NO), the MPA 13 proceeds to SP4.

On the other hand, if the analyzed command in the read access instruction or write access instruction is a response-required read access instruction or response-required write access instruction (SP2: YES), the MPA 13 checks whether or not the buffer 62A in the storage unit 62 is full by using the inverter 35A-35D, i.e., the MPA 13 checks whether or not a 'buffer full' signal is sent to the inverter 35A-35D (SP3).

If the buffer 62A in the storage unit 62 is full (SP3: YES), the MPA 13 waits in standby mode for the buffer 62A in the storage unit 62 to become not full (SP3).

On the other hand, if the buffer 62A in the storage unit 62 is not full (SP3: NO), the MPA 13 transfers a response-required access request or a response-free access request to the response-required/response-free round-robin sequencer 41 and/or the response-free round-robin sequencer 42 in the arbiter 22 by using the AND circuit 33A-33D or the AND circuit 34A-34D (SP4).

The MPA 13 then determines which of the read access instruction and write access instruction should be exclusively transferred to the cache memory controller 15 in the order of priority determined by round robin, by using the response-required/response-free round-robin sequencer 41 and/or the response-free round-robin sequencer 42, and transfers the transfer command to the selector 23 by using the selector 43 (SP5).

If the transfer command is a response-required read access instruction or response-required write access instruction, the MPA 13 stores the response-required read access instruction or response-required write access instruction transferred by the selector 23 in the buffer 62A in the storage unit 62 by using the transfer control sequencer 61, and changes a flag 62B from "0" to "1" (SP6).

The MPA 13 then transfers the read access instruction or write access instruction, which is indicated by the selector 23 to be transferred, to the cache memory controller 15 (SP7).

After executing the above-described steps, the MPA 13 eventually terminates the access instruction transfer processing steps RT1 illustrated in FIG. 7 (SP8).

Next, access completion response transfer processing executed by the storage controller 6 in the storage system 1 according to the present embodiment will be described.

Figure 8:
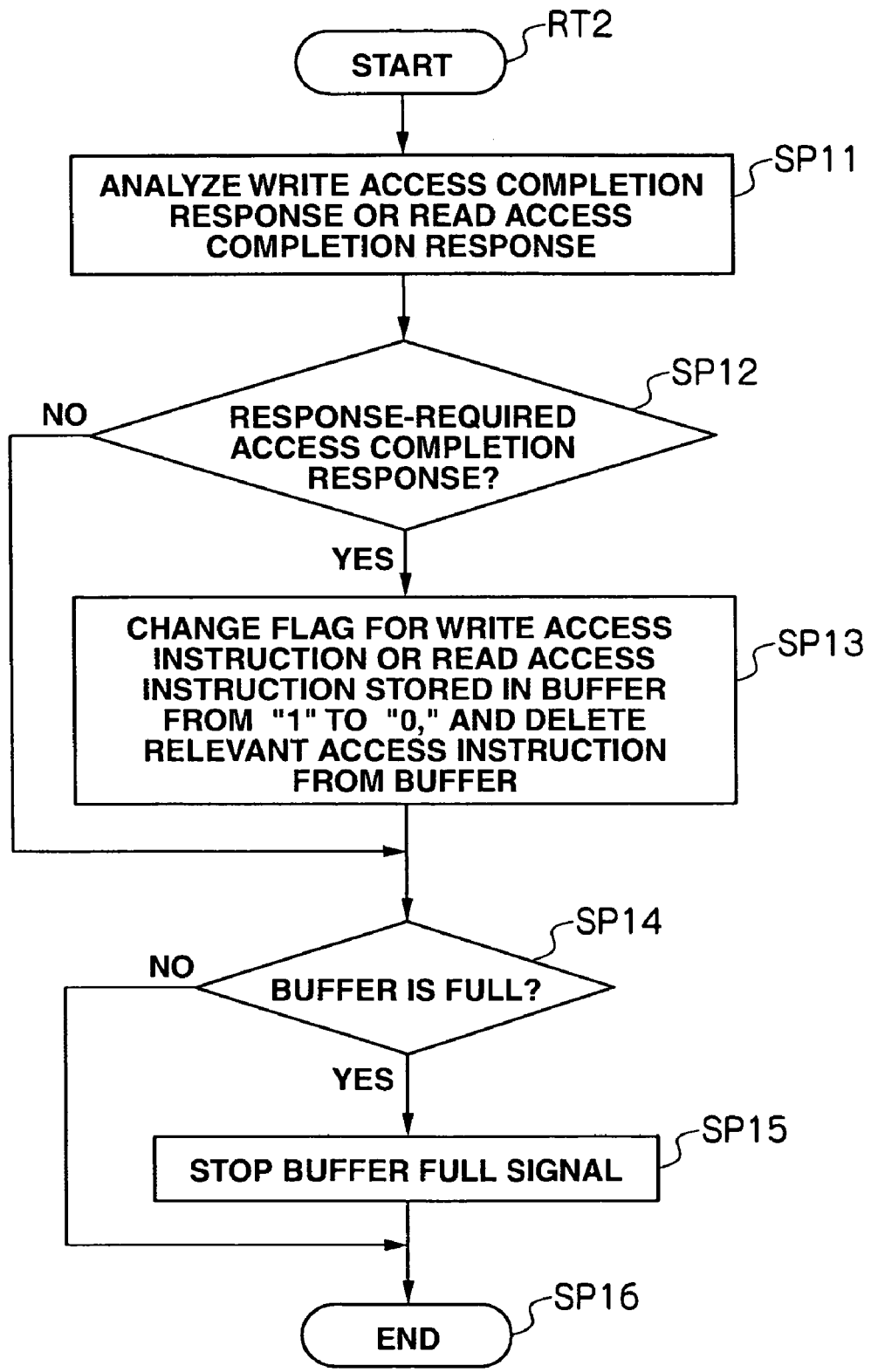
FIG. 8 is a flowchart illustrating access completion response transfer processing steps.

FIG. 8 is an example of the flowchart illustrating specific processing steps of the MPA 13 in the storage controller 6, and the steps relate to the access completion response transfer processing.

When receiving a read access completion response or write access completion response from the cache memory controller 15, the MPA 13 analyzes a command in the read access completion response or write access completion response by the data analysis sequencer 51, in accordance with access completion response transfer processing steps RT2 illustrated in FIG. 8 (SP11).

The MPA 13 then checks whether or not the command, which is analyzed by the data analysis sequencer 51, in the read access completion response or write access completion response is a response-required read access completion response or response-required write access completion response (SP12).

If the analyzed command in the read access completion response or write access completion response is not a response-required read access completion response or response-required write access completion response (SP12: NO), the MPA 13 proceeds to SP14.

On the other hand, the analyzed command in the read access completion response or write access completion response is a response-required read access completion response or response-required write access completion response (SP12: YES), the MPA 13 changes a flag 62B in the storage unit 62 from "1" to "0," and deletes a read access instruction or write access instruction which corresponds to the read access completion response or write access completion response from the buffer 62A in which the relevant instruction is stored (SP13).

The MPA 13 then checks whether or not the buffer 62A in the storage unit 62 is full by using the AND circuit 63, i.e., the MPA 13 checks whether or not the 'buffer BUSY' signals for all of the storage unit 62 is sent to the AND circuit 63 (SP14).

If the buffer 62A in the storage unit 62 is not full (SP14: NO), the MPA 13 eventually terminates the access completion response transfer processing steps RT2 illustrated in FIG. 8 (SP16).

On the other hand, if the buffer 62A in the storage unit 62 is full (SP14: YES), the MPA 13 stops the AND circuit 63 from sending a 'buffer full' signal (SP15), and then eventually terminates the access completion response transfer processing steps RT2 illustrated in FIG. 8 (SP16).

Incidentally, in the storage system 1, the data transfer of a read access instruction or write access instruction is performed between the channel controller 11 and the cache memory controller 15, based on an access instruction or access completion response.

Figure 9:
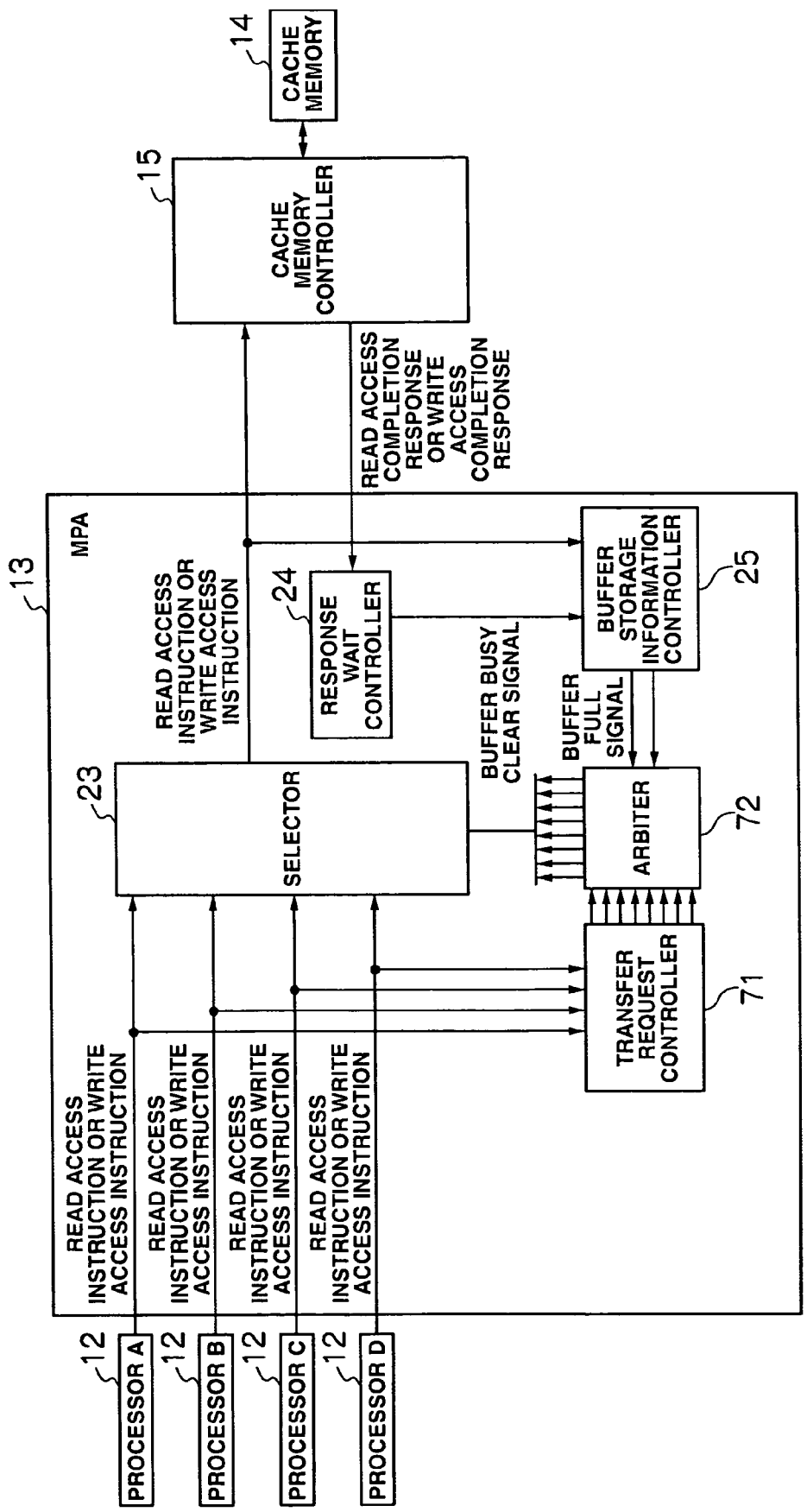
FIG. 9 is a block diagram showing the schematic configuration of a storage system according to another embodiment.

FIG. 9 shows the configuration of the storage system 1 according to another embodiment. The storage system 1 in the present embodiment is described with reference to the case when the buffer storage information controller 25 sends a 'buffer full' signal to the transfer request controller 21, and the transfer request controller 21 stops transferring a response-required access request. However, the invention is not limited to that embodiment, and as shown in FIG. 9, the buffer storage information controller 25 may send a 'buffer full' signal only to the arbiter 22, and the arbiter may stop transferring a response-required access request, and the invention may be also utilized in other various embodiments.

Figure 10:
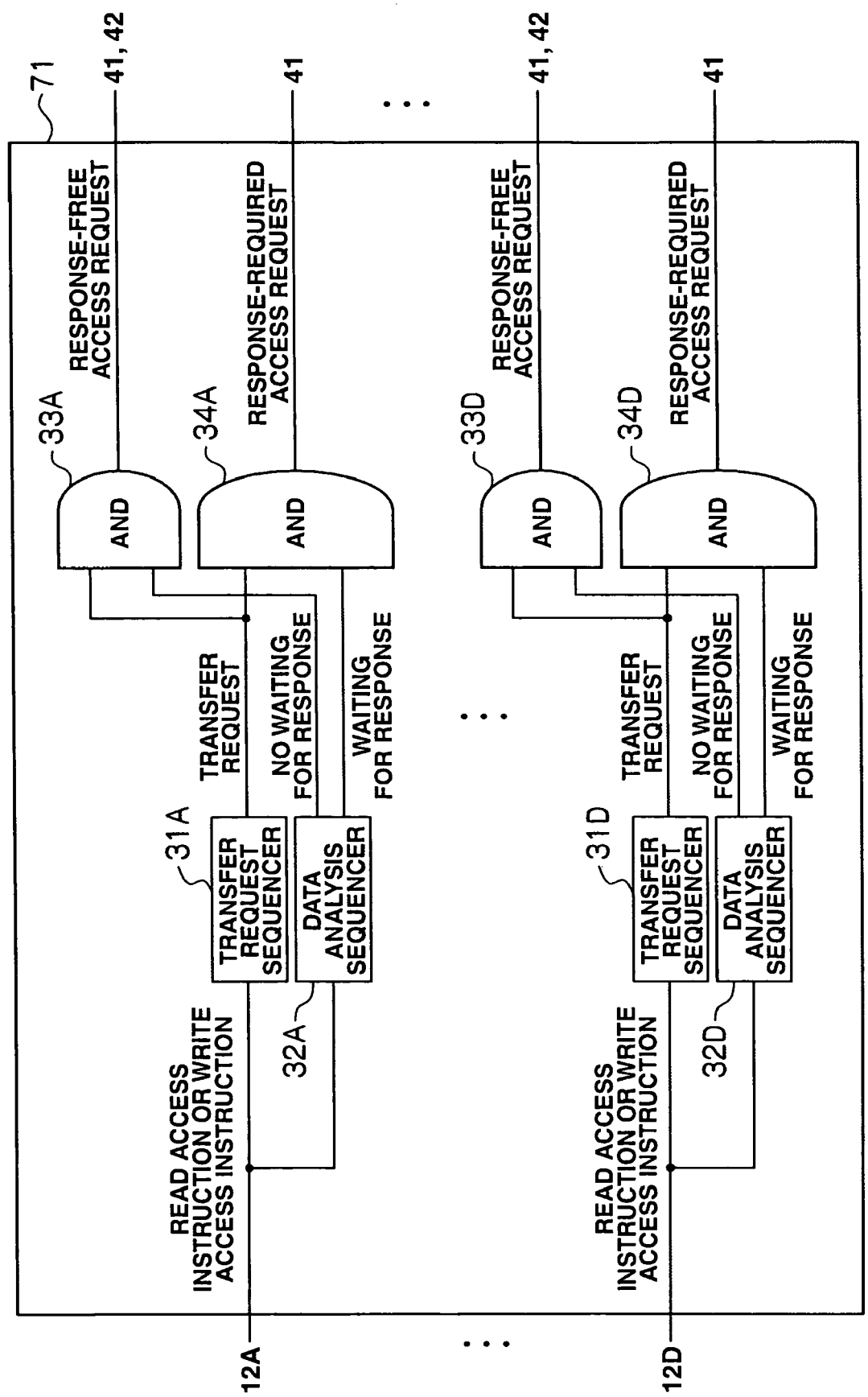
FIG. 10 is a block diagram showing the schematic configuration of a transfer request controller according to another embodiment

FIG. 10 shows the configuration of a transfer request controller 71 in the storage system 1 according to another embodiment. The transfer request controller 71 is configured the same way as the transfer request controller 21 according to the present embodiment, except that the transfer request controller 71 does not include, for example, the inverter 35A-35D.

Figure 11:
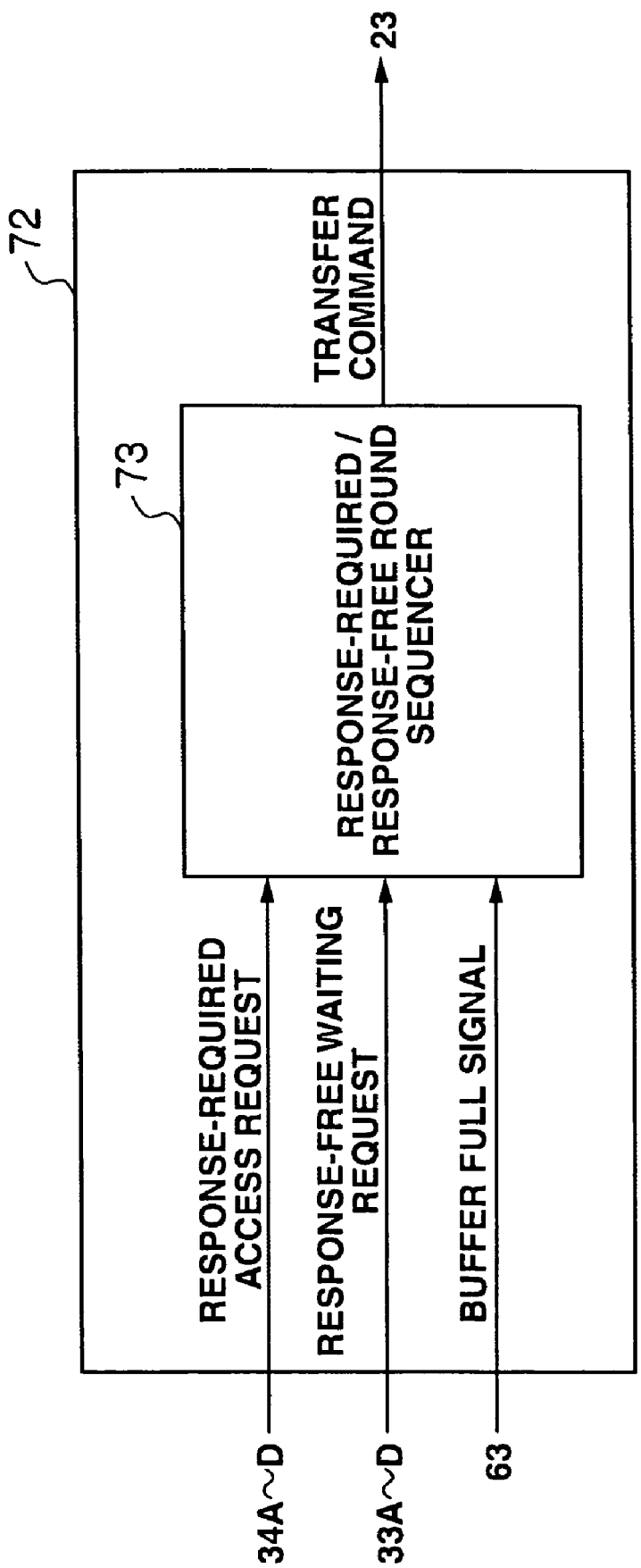
FIG. 11 is a block diagram showing the schematic configuration of an arbiter according to another embodiment.

FIG. 11 shows the configuration of an arbiter 74 in the storage system according to another embodiment. The arbiter is configured by including a response-required/response-free round-robin sequencer 73. Based on whether or not a 'buffer full' signal is sent, the response-required/response-free round-robin sequencer 73 determines which of the read access instruction and write access instruction should be exclusively transferred to the cache memory controller 15 in the order of priority determined by round robin, in accordance with a response-free access request transferred from the AND circuit 33A-33D in the transfer request controller 71 and a response-required access request transferred from the AND circuit 34A-34D; and transfers the transfer command to the selector 23.

Thus, in the storage system 1, a read access instruction or write access instruction transferred from the processors A-D is stored in the buffer 62A in the storage unit 62 in the buffer storage information controller 25, and when read access instructions or write access instructions are stored in all of the buffer 62A, only a response-free read access instruction or response-free write access instruction is transferred to the cache memory controller 15.

Accordingly, when response-required read access instructions or response-required write access instructions are stored in all of the buffer 62A, it is possible to effectively prevent the transfer of a response-free read access instruction or response-free write access instruction from stopping, and to transfer only data corresponding to the response-free read access instruction or response-free write access instruction.

Incidentally, in the present embodiment, the invention is described with reference to sending a read access instruction or write access instruction. However, the invention is not limited to that embodiment, and may also be applied to, for example, other various access requests.

Furthermore, in the present embodiment, the invention is described with reference to the case where the MPA 13 in FIG. 2 is shown as a functional block diagram. However, the invention is not limited to that embodiment, and more specifically, each kind of processing may be executed by executing a series of processing by hardware having respective functions; or each kind of processing may be executed by executing a control program using a controller, etc., in the MPA 13, and the invention may be applied to other various embodiments.

The present invention can be broadly applied to a storage device having an arbiter allowing an exclusive access by arbitrating accesses from plural processors.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage device for storing data sent from a host apparatus, comprising:
a plurality of processors sending an access instruction to a cache memory controller, the access instruction relating to transmission of the data and based on an access request relating to the transmission of the data, the access request being sent from the host apparatus; and an access instruction sending unit sending the access instruction to the cache memory controller, wherein the access instruction sending unit includes
- a plurality of storage units for storing an access instruction which requires a response, and wherein
- when all of the plurality of storage units are full, the access instruction sending unit sends only an access instruction which does not require a response to the cache memory controller.

2. The storage device according to claim 1, wherein:

when all of the plurality of storage units are full, the access instruction sending unit sends only an access instruction which does not require a response to the cache memory controller in an order of priority determined by a round robin selection.

3. The storage device according to claim 1, wherein:

when all of the plurality of storage units are not full, the access instruction sending unit sends an access instruction which requires a response or an access instruction which does not require a response to the cache memory controller in an order of priority determined by a round robin selection.

4. The storage device according to claim 3, wherein:

when receiving an access completion response from the cache memory controller corresponding to the access instruction which requires a response, the access instruction sending unit deletes the access instruction which requires a response from the storage unit.

5. The storage device according to claim 4, wherein:

after deleting the access instruction which requires a response from the storage unit, the access instruction sending unit resumes sending an access instruction which requires a response or an access instruction which does not require a response to the cache memory controller.

6. An access instruction sending method for a storage device storing data sent from a host apparatus, comprising:
- a first step in which a plurality of processors sends an access instruction to a cache memory controller, the access instruction relating to transmission of the data, and based on an access request relating to the transmission of the data, the access request being sent from the host apparatus; and
- a second step in which an access instruction sending unit sends the access instruction to the cache memory controller, wherein in the second step,
when all of the plurality of storage units where an access instruction which requires a response is stored are full, only sending an access instruction which does not require a response to the cache memory controller.

7. The access instruction sending method according to claim 6, wherein:

in the second step,
when all of the plurality of storage units are full, an access instruction which does not require a response is sent to the cache memory controller in an order of priority determined by a round robin selection.

8. The access instruction sending method according to claim 6, wherein:

in the second step,
when all of the plurality of storage units are not full, an access instruction which requires a response or an access instruction which does not require a response are sent to the cache memory controller in an order of priority determined by a round robin selection.

9. The access instruction sending method according to claim 8, wherein:

in the second step,
when an access completion response corresponding to the access instruction which requires a response is received from the cache memory controller, the access instruction which requires a response is deleted from the storage unit.

10. The access instruction sending method according to claim 9, wherein:

in the second step,
after deleting the access instruction which requires a response from the storage unit, resuming the sending of an access instruction which requires a response or an access instruction which does not require a response to the cache memory controller.

* * * * *